Feb. 26, 1957     M. HARLEY     2,782,558
CALL DEVICE
Filed Aug. 29, 1955
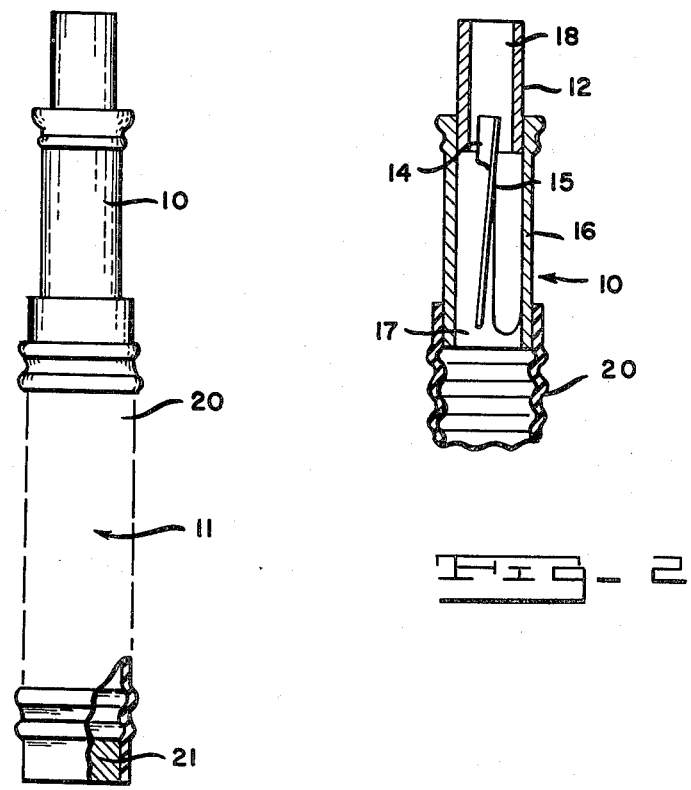
INVENTOR.
MAX HARLEY
BY
*Cullen & Cantor*
ATTORNEYS

United States Patent Office 2,782,558
Patented Feb. 26, 1957

2,782,558

CALL DEVICE

Max Harley, Highland Park, Mich.

Application August 29, 1955, Serial No. 531,051

2 Claims. (Cl. 46—180)

This application relates to call devices.

A call device is a device used for calling game birds or animals. One such device, as manufactured by the Philip S. Olt Company of Pekin, Illinois, is a black, hard rubber mouth-piece into which the bird caller blows at one open end for vibrating a reed, and thus, simultating a bird call.

A principal object of the present invention is to create a novel form of call device of which the conventional call device forms only a part, the device as a whole enabling superior calls to be performed, and without requiring the user to blow into the call device.

More specifically, a principal object is to provide a call device which is operated by being held in the hand of the user and shaken or vibrated merely by hand movement rather than by requiring the user to blow into the call device. By holding the device of the invention in his hand and shaking it the user obtains a call effect far more realistic and considerably greater in duration than can be obtained by the conventional method of blowing, namely blowing into the device.

The elimination of the requirement of blowing into the device eliminates difficulties that might arise in freezing weather due to the presence of moisture from the user's breath freezing within the device, and thus freezing the reed against vibration.

Further objects of the invention will presently be understood upon reference to the appended drawing and description. In this drawing:

Fig. 1 is an elevation view showing the tube partly in section.

Fig. 2 is a fragmentary elevation section view.

The call device hereof comprises a conventional head 10 and a flexible tube body 11.

The head 10 is of conventional form and has a hollow reed holder 12, a reed cork 14, and a reed 15, all disposed within a hollow element 16, these parts forming a mouth piece or head 10 normally blown into by one's mouth at the air inlet 17 with air exiting at outlet 18.

This mouthpiece 10 is conventionally used by the user blowing with his mouth into the air inlet port 17 while he holds the mouthpiece 10 in his hand at his mouth.

The mouthpiece 10 just described forms only one part of my entire device. The other part is a long, cylindrical tube 20 of flexible air-tight material such as rubber, preferably transversely ribbed for maximum flexibility. The tube is closed at one end by a weight plug 21 and has its other end open and seal fitted over the air inlet port 17 of the mouthpiece 10. The two parts 10—11 together form a combination of unitary form.

When the operator holds the device in vertical position with his hand around the head part 10 only and his palm overlying the air outlet port 18, and then shakes the device, the tube being extremely flexible and suspended, and especially if weighted at the lower end as is preferred, will wobble around and flex during the shaking of the device with the result there will be produced a call far more realistic in that it simulates the prolonged sounding of a large number of birds or animals as the case may be, as contrasted from the repeated single calls obtained by the user blowing into the head part of the device with his mouth at the air inlet port.

The advantages of the device, other than those just mention, have previously been referred to, and there is no need for referring to them again at this point.

Now having described the call device hereof, reference should be had to the claims which follow.

I claim:

1. A hunter's call device comprising a conventional call head and a body, said call head being of conventional form and having a vibrating reed, and open at both ends to provide air inlet and outlet ports, said body comprising a long limp tube of highly resilient highly flexible airtight material, such as rubber, in the form of a cylinder, whose length is considerably greater than its diameter, with a closed end opposite the head end, the latter end being open and seal fitted over the air inlet port of the head, whereby the device may be manipulated for game calling by holding the call head in one's palm with the outlet end of the head covered by the palm and with the tube suspending freely from the palm, and shaking the tube freely and rapidly in short jerky strokes from the palm while the tube is so suspended, with the tube being long enough and limp enough and of small enough diameter and resilient enough to whip or distort substantially by bending out of vertical when so shaken to expel air from within the tube outwardly through said head to produce sounds while so shaken, the sounds being a continuous chatter during the period of shaking to simulate a duck feed call.

2. A construction according to claim 1 wherein the tube is transversely annularly ribbed.

References Cited in the file of this patent

UNITED STATES PATENTS

| 414,660 | Sellers | Nov. 5, 1889 |
| 677,113 | Bruce | June 25, 1901 |
| 953,586 | Bolles | Mar. 29, 1910 |
| 1,769,251 | Bocchino | July 1, 1930 |